(12) United States Patent
Jing et al.

(10) Patent No.: US 11,794,170 B2
(45) Date of Patent: Oct. 24, 2023

(54) TWC CATALYSTS CONTAINING HIGH DOPANT SUPPORT

(71) Applicant: JOHNSON MATTHEY PUBLIC LIMITED COMPANY, London (GB)

(72) Inventors: Yuan Jing, Sapporo (JP); Shuhei Nagaoka, Tochigi (JP); Ken-ichi Shimizu, Sapporo (JP); Takashi Toyao, Sapporo (JP)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 17/455,596

(22) Filed: Nov. 18, 2021

(65) Prior Publication Data

US 2022/0072515 A1     Mar. 10, 2022

Related U.S. Application Data

(62) Division of application No. 16/522,732, filed on Jul. 26, 2019, now abandoned.
(Continued)

(51) Int. Cl.
*B01J 21/04* (2006.01)
*B01J 23/10* (2006.01)
(Continued)

(52) U.S. Cl.
CPC ............ *B01J 23/63* (2013.01); *B01J 21/04* (2013.01); *F01N 3/101* (2013.01); *F01N 2370/02* (2013.01); *F01N 2510/0684* (2013.01)

(58) Field of Classification Search
CPC ... B01J 21/04; B01J 23/10; B01J 23/44; B01J 23/464; B01J 23/58; B01J 23/63; B01J 35/04; F01N 3/101; B01D 53/94
See application file for complete search history.

(56) References Cited

U.S. PATENT DOCUMENTS 4,528,279 A    7/1985  Suzuki
4,675,308 A *  6/1987  Wan .................. B01J 37/04
                                         502/302
(Continued)

FOREIGN PATENT DOCUMENTS

CN     102247838 A    11/2011
CN     103201032 A     7/2013
(Continued)

OTHER PUBLICATIONS

Previously cited in U.S. Appl. No. 16/522,732 Nishio Y et al.; Formation of featured nano-structure in thermal stable La-doped alumina composite catalyst; Journal of Alloys and Compounds, 2009 (488) 2 pp. 546-549.
(Continued)

*Primary Examiner* — Cam N. Nguyen
(74) *Attorney, Agent, or Firm* — Ni Yan

(57) ABSTRACT

A three-way catalyst article, and its use in an exhaust system for internal combustion engines, is disclosed. The catalyst article for treating exhaust gas comprising: a substrate; and a first catalytic region on the substrate; wherein the first catalytic region comprises a first PGM component and a first inorganic oxide, wherein the IR intensity ratio of bridge CO to atop CO on the PGM component is less than 3:1 under standard CO adsorption procedure.

11 Claims, 3 Drawing Sheets

IR Intensity Ratio of bridge CO to atop CO on Pd/La-Al$_2$O$_3$ catalysts

Related U.S. Application Data

(60) Provisional application No. 62/711,034, filed on Jul. 27, 2018.

(51) Int. Cl.
  *B01J 23/44* (2006.01)
  *B01J 23/46* (2006.01)
  *B01J 23/58* (2006.01)
  *B01J 23/63* (2006.01)
  *B01J 35/04* (2006.01)
  *F01N 3/10* (2006.01)
  *B01D 53/94* (2006.01)

(56) References Cited

U.S. PATENT DOCUMENTS

| | | | |
|---|---|---|---|
| 4,678,770 A * | 7/1987 | Wan | B01D 53/945 502/302 |
| 4,904,633 A * | 2/1990 | Ohata | B01J 23/63 502/328 |
| 4,966,879 A | 10/1990 | Baird, Jr. | |
| 4,992,405 A * | 2/1991 | Chattha | B01D 53/945 502/303 |
| 5,028,575 A | 7/1991 | Yates, Jr. et al. | |
| 5,108,978 A | 4/1992 | Durand et al. | |
| 5,116,800 A | 5/1992 | Williamson et al. | |
| 5,128,306 A * | 7/1992 | Dettling | B01J 23/63 423/213.5 |
| 5,212,142 A * | 5/1993 | Dettling | B01J 23/464 502/302 |
| 5,248,650 A * | 9/1993 | Sekiba | B01D 53/945 502/303 |
| 5,492,880 A | 2/1996 | Zaki et al. | |
| 5,494,878 A | 2/1996 | Murakami | |
| 6,015,285 A * | 1/2000 | McCarty | B01J 23/44 502/340 |
| 6,087,298 A * | 7/2000 | Sung | F01N 3/2803 502/328 |
| 6,464,579 B1 * | 10/2002 | Salazar | F24F 13/075 454/316 |
| 6,497,851 B1 * | 12/2002 | Hu | B01J 37/0228 422/177 |
| 6,692,712 B1 * | 2/2004 | Andersen | B01J 23/63 423/239.1 |
| 6,896,857 B2 | 5/2005 | Nakamura | |
| 7,189,376 B2 * | 3/2007 | Kumar | F01N 3/28 422/177 |
| 7,517,510 B2 * | 4/2009 | Chen | B01J 37/0244 422/177 |
| 7,524,465 B2 * | 4/2009 | Kumar | B01J 23/44 422/180 |
| 7,550,124 B2 * | 6/2009 | Chen | F01N 13/0097 422/177 |
| 7,737,077 B2 * | 6/2010 | Kitamura | B01J 23/40 502/262 |
| 7,758,834 B2 * | 7/2010 | Chen | F01N 13/0097 60/299 |
| 7,879,128 B2 | 2/2011 | El-Shall | |
| 7,888,278 B2 | 2/2011 | Rapier | |
| 7,922,988 B2 * | 4/2011 | Deeba | B01D 53/9472 422/177 |
| 7,985,706 B2 | 7/2011 | Okada | |
| 7,998,424 B2 * | 8/2011 | Bergeal | B01D 53/945 422/222 |
| 8,003,565 B2 | 8/2011 | Hagemeyer | |
| 8,039,418 B2 * | 10/2011 | Kitamura | B01J 37/0244 502/328 |
| 8,207,078 B2 * | 6/2012 | Lu | B01J 23/63 502/64 |
| 8,323,599 B2 * | 12/2012 | Nunan | B01J 35/0006 60/299 |
| 8,394,348 B1 * | 3/2013 | Nunan | B01J 35/04 60/299 |
| 8,465,711 B2 | 6/2013 | Ikeda | |
| 8,501,661 B2 * | 8/2013 | Sunada | B01D 53/945 502/333 |
| 8,568,675 B2 * | 10/2013 | Deeba | B01J 37/0248 422/177 |
| 8,617,496 B2 * | 12/2013 | Wei | B01J 35/04 502/514 |
| 8,796,172 B2 * | 8/2014 | Chinzei | B01J 35/0006 502/262 |
| 8,833,064 B2 * | 9/2014 | Galligan | B01J 37/0244 502/262 |
| 8,853,120 B2 * | 10/2014 | Aoki | B01D 53/945 502/527.12 |
| 8,968,690 B2 * | 3/2015 | Nunan | B01J 35/1019 422/177 |
| 8,999,252 B2 | 4/2015 | Cho et al. | |
| 9,174,198 B2 * | 11/2015 | Kawabata | B01D 53/94 |
| 9,174,199 B2 | 11/2015 | Zhang | |
| 9,242,242 B2 * | 1/2016 | Hilgendorff | B01J 37/0248 |
| 9,266,092 B2 * | 2/2016 | Arnold | B01J 23/63 |
| 9,314,771 B2 | 4/2016 | D'Souza | |
| RE46,145 E | 9/2016 | Okada | |
| 9,440,223 B2 * | 9/2016 | Aoki | B01J 35/0006 |
| 9,486,793 B2 * | 11/2016 | Klingmann | B01J 23/63 |
| 9,522,360 B2 * | 12/2016 | Schmidt | F01N 3/0864 |
| 9,522,385 B2 * | 12/2016 | Sasaki | B01J 23/44 |
| 9,597,663 B2 | 3/2017 | Inoda | |
| 9,604,175 B2 * | 3/2017 | Hatfield | B01J 23/83 |
| 9,636,634 B2 * | 5/2017 | Chiffey | B01J 37/0036 |
| 9,643,161 B2 * | 5/2017 | Chiffey | F01N 3/2842 |
| 9,656,209 B2 * | 5/2017 | Chang | B01J 37/0063 |
| 9,731,273 B2 | 8/2017 | D'Souza | |
| 9,828,896 B2 | 11/2017 | Swallow | |
| 9,849,423 B2 * | 12/2017 | Chiffey | B01J 23/58 |
| 9,987,618 B2 * | 6/2018 | Chiffey | B01J 29/7007 |
| 10,010,873 B2 * | 7/2018 | Aoki | F01N 3/2828 |
| 10,022,705 B2 * | 7/2018 | Kimura | B01J 35/04 |
| 10,058,846 B2 | 8/2018 | Saito | |
| 10,118,156 B2 * | 11/2018 | Horaguchi | B01J 37/08 |
| 10,150,082 B2 * | 12/2018 | Yoshikawa | B01J 37/08 |
| 10,183,253 B2 * | 1/2019 | Onoe | B01J 23/63 |
| 10,201,805 B2 | 2/2019 | Ohashi | B01J 21/066 |
| 10,286,359 B2 * | 5/2019 | Chiffey | B01J 23/58 |
| 10,337,372 B2 * | 7/2019 | Nobukawa | F01N 3/2066 |
| 10,357,744 B2 * | 7/2019 | Ohashi | B01D 53/94 |
| 10,391,478 B2 | 8/2019 | Duran-Martin | |
| 10,512,898 B2 * | 12/2019 | Deeba | B01J 23/63 |
| 10,556,223 B2 | 2/2020 | Suzuki | |
| 10,569,257 B2 * | 2/2020 | Chiffey | B01D 53/9468 |
| 10,576,420 B2 | 3/2020 | Chinzei | |
| 10,625,208 B2 | 4/2020 | Bergeal et al. | |
| 10,704,441 B2 * | 7/2020 | Yamashita | B01J 27/232 |
| 10,744,459 B2 * | 8/2020 | Hoke | F01N 3/2066 |
| 10,773,209 B2 * | 9/2020 | Liu | B01J 37/0225 |
| 10,987,658 B2 * | 4/2021 | Camm | B01D 53/945 |
| 11,130,096 B2 * | 9/2021 | Shacklady-Mcatee | B01J 23/8986 |
| 11,161,098 B2 | 11/2021 | Nunan | B01J 37/0201 |
| 11,248,505 B2 * | 2/2022 | Sung | B01D 53/944 |
| 11,260,372 B2 * | 3/2022 | Xue | B01J 35/0006 |
| 2001/0046941 A1 | 11/2001 | Mussmann et al. | |
| 2005/0176580 A1 | 8/2005 | Osaka | |
| 2005/0265920 A1 | 12/2005 | Ercan et al. | |
| 2006/0257305 A1 | 11/2006 | Yang | |
| 2007/0099298 A1 | 5/2007 | Suzuki | |
| 2007/0179054 A1 * | 8/2007 | Akamine | B01J 23/63 423/212 |
| 2007/0238605 A1 | 10/2007 | Strehlau | |
| 2009/0209408 A1 * | 8/2009 | Kitamura | B01J 23/002 502/328 |
| 2009/0257933 A1 | 10/2009 | Chen et al. | |
| 2012/0055141 A1 | 3/2012 | Hilgendorff | |
| 2012/0128558 A1 | 5/2012 | Nunan et al. | |
| 2012/0308439 A1 | 12/2012 | Chen et al. | |
| 2013/0143732 A1 | 6/2013 | Aoki | |
| 2014/0038812 A1 * | 2/2014 | Hori | B01J 37/0244 502/304 |
| 2015/0158023 A1 | 6/2015 | Rajaram | |

(56) References Cited

U.S. PATENT DOCUMENTS

| | | |
|---|---|---|
| 2015/0196899 A1* | 7/2015 | Imoto ............... B01D 53/9445 502/213 |
| 2016/0236180 A1 | 8/2016 | Hoyer et al. |
| 2016/0288096 A1 | 10/2016 | Fujiwara |
| 2017/0137285 A1 | 5/2017 | Ide et al. |
| 2017/0320046 A1 | 11/2017 | Armitage et al. |
| 2017/0356317 A1 | 12/2017 | Armitage et al. |
| 2018/0094559 A1 | 4/2018 | Martin |
| 2018/0141031 A1 | 5/2018 | Nazarpoor |
| 2018/0169624 A1* | 6/2018 | Chandler ............... B01J 23/58 |
| 2018/0214860 A1 | 8/2018 | Qi |
| 2018/0280878 A1* | 10/2018 | Inoda ................. B01J 35/0006 |
| 2018/0311646 A1 | 11/2018 | Chandler |
| 2018/0318800 A1* | 11/2018 | Chandler ............... B01J 35/04 |
| 2018/0318801 A1* | 11/2018 | Chandler ............. F01N 3/0814 |
| 2019/0111389 A1* | 4/2019 | Camm ................. B01J 23/10 |
| 2019/0126247 A1 | 5/2019 | Deeba |
| 2019/0240643 A1* | 8/2019 | Karpov ............... B01J 23/44 |
| 2019/0366303 A1 | 12/2019 | Duran-Martin |
| 2020/0208557 A1 | 7/2020 | Armitage |
| 2021/0283580 A1* | 9/2021 | Zheng ................. B01J 35/1019 |

FOREIGN PATENT DOCUMENTS

| | | |
|---|---|---|
| CN | 104797335 A | 7/2015 |
| CN | 104937225 A | 9/2015 |
| EP | 0561904 A | 9/1993 |
| EP | 2 335 823 A1 | 6/2011 |
| EP | 2643078 A | 10/2013 |
| JP | 2014-505587 A | 3/2014 |
| RU | 2 440 187 C2 | 1/2012 |
| RU | 2504431 C2 | 1/2014 |
| RU | 2549402 C1 | 4/2015 |
| RU | 2658002 C2 | 6/2018 |
| WO | 2010/023919 A1 | 3/2010 |
| WO | 2010/071205 A1 | 5/2012 |
| WO | 2012/091913 A2 | 7/2012 |
| WO | 2010/137657 A1 | 11/2012 |
| WO | 2014080200 A1 | 5/2014 |
| WO | 2014132034 A1 | 9/2014 |
| WO | 2015095056 A1 | 6/2015 |
| WO | 2017178991 A1 | 10/2017 |
| WO | 2019189482 A1 | 10/2019 |

OTHER PUBLICATIONS

Previously cited in U.S. Appl. No. 16/522,732 Shinjoh, "Rare Earth Metals for Automotive Exhaust Catalysts," J Alloys and Compounds 2006 (408-412) pp. 1061-1064.

Previously cited in U.S. Appl. No. 16/522,732 Thevenin et al., "Characterization and Activity of Supported Palladium Combustion Catalysts," J of Catalysis 2002 (207) pp. 139-149.

* cited by examiner

FIG. 1a IR Intensity Ratio of bridge CO to atop CO on Pd/La-Al$_2$O$_3$ catalysts
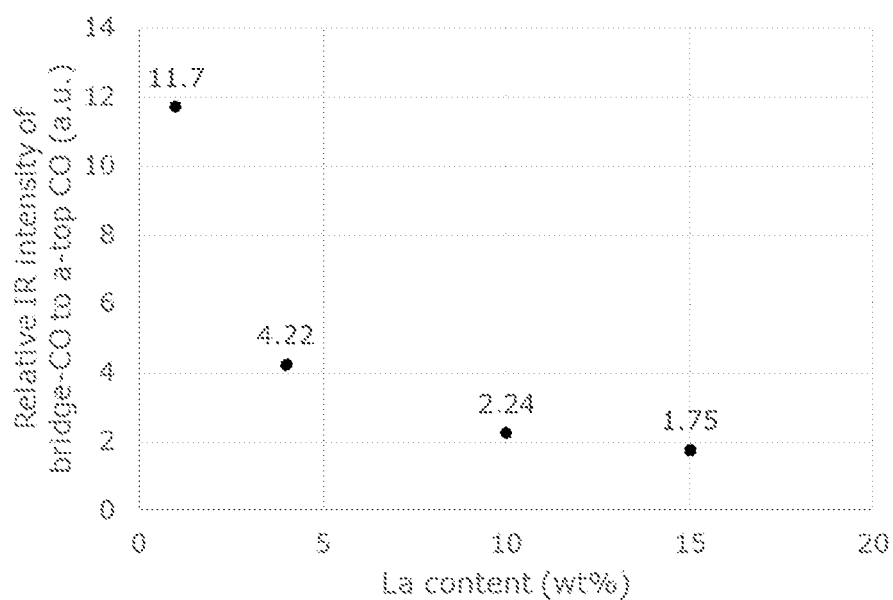
FIG. 1b IR Spectra of bridge CO to atop CO on Pd/La-Al$_2$O$_3$ catalysts
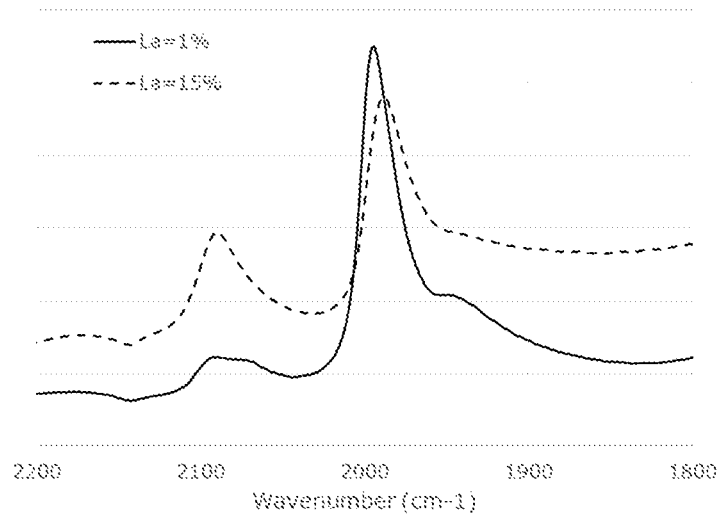

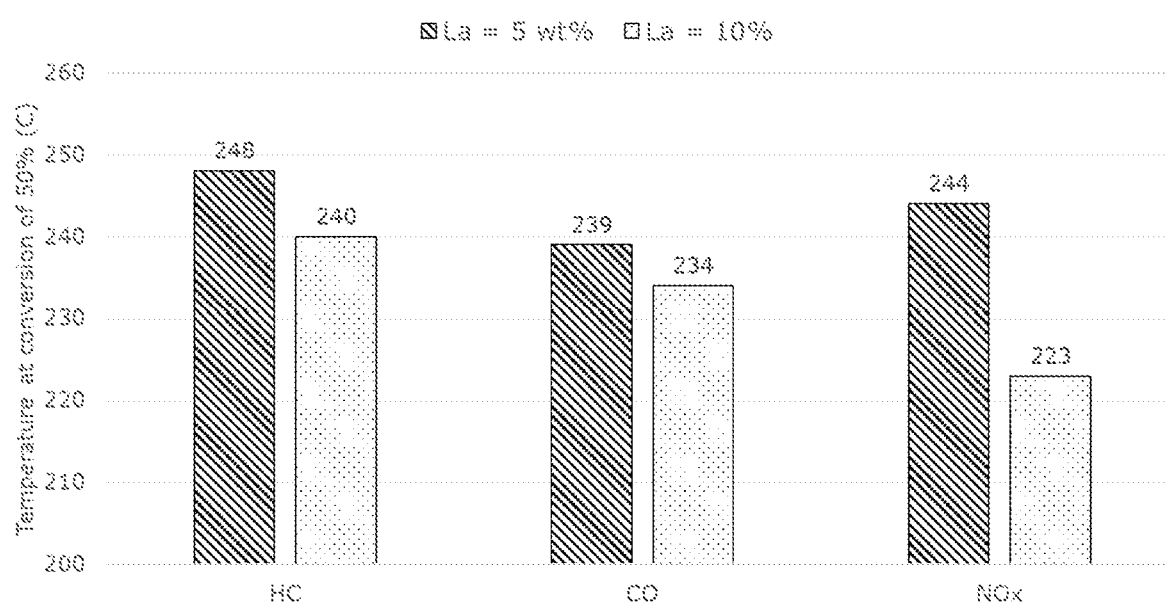
FIG. 2 Catalyst Performance on Pd/La-Al$_2$O$_3$ coated catalysts

FIG. 3a IR Intensity Ratio of gem-dicarbonyl to atop CO on Rh/La-Al$_2$O$_3$ catalysts
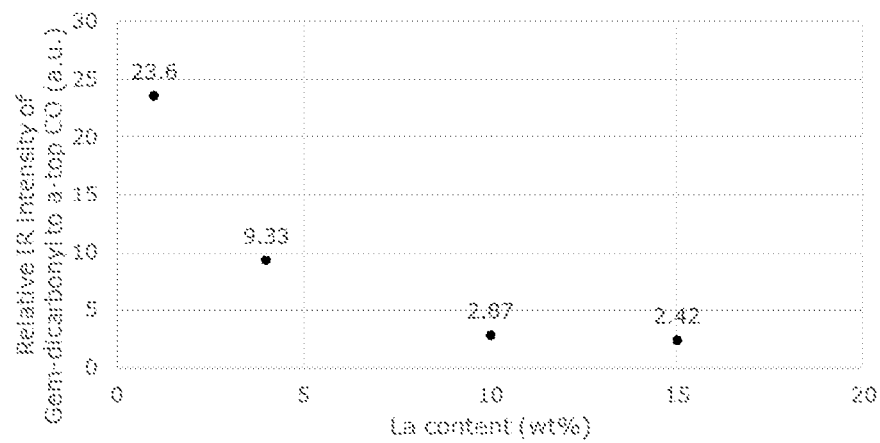
FIG. 3b IR Spectra of gem-dicarbonyl to atop CO on Rh/La-Al2O3 catalysts
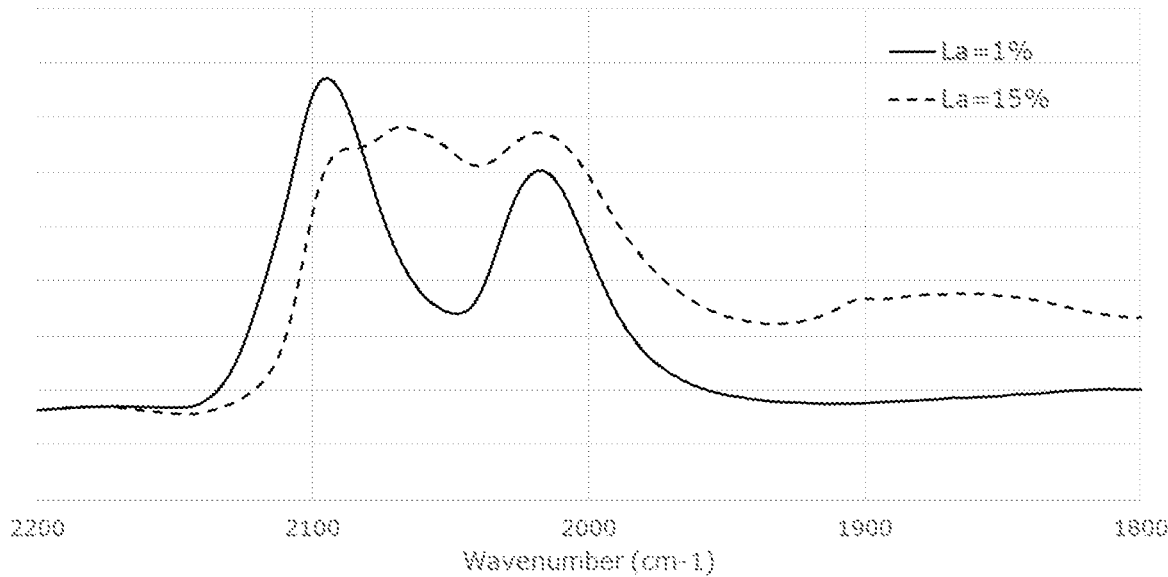

TWC CATALYSTS CONTAINING HIGH DOPANT SUPPORT

FIELD OF THE INVENTION

The present invention relates to a catalyzed article useful in treating exhaust gas emissions from gasoline engines.

BACKGROUND OF THE INVENTION

Internal combustion engines produce exhaust gases containing a variety of pollutants, including hydrocarbons (HCs), carbon monoxide (CO), and nitrogen oxides ("$NO_x$"). Emission control systems, including exhaust gas catalysts, are widely utilized to reduce the amount of these pollutants emitted to atmosphere. A commonly used catalyst for gasoline engine applications is the TWC. TWCs perform three main functions: (1) oxidation of CO; (2) oxidation of unburnt HCs; and (3) reduction of $NO_x$ to $N_2$.

In most catalytic converters, platinum group metals (PGMs) (e.g., Pt, Pd, and Rh) have been widely used as active site of catalytic conversion with other inorganic compounds e.g. alumina and ceria-zirconia mixed oxide for the support carriers. As the temperature of TWC would reach around 1000° C., particularly under high-load operation of gasoline vehicle, the support carriers are usually stabilized by dopant element. In the case of alumina materials, for example, the thermal durability is significantly improved by doped lanthanum (La) and the lower content of below 5 wt % of La has been typically used in the alumina for TWC since the thermal stability of the alumina materials reaches maximum around 1-2 wt % and is almost unchanged up to 5 wt % (for example, see Thevenin et al., Journal of Catalysis, 2002, 207, 139-149; Shinjoh, Journal of Alloys and Compounds, 2006, 408-412, 1061-1064). This improved thermal stability of the support carrier contributes higher dispersion of PGM particles to make TWC with higher catalytic performance.

On the other hand, in the exhaust gas of gasoline engine, concentration of CO is significantly higher than that of other harmful gasses of HC and $NO_x$ so that PGM is usually poisoned by high concentration CO, i.e., covering PGM active site by strongly adsorbed CO, resulting in deactivated catalytic performance. The countermeasure toward the poisoning of PGM is another technical approach to keep the active site of PGM and to promote the catalytic conversion in the presence of high concentration CO gas. This invention solves these needs to reduce the effect of CO poisoning for the improved TWC performance.

SUMMARY OF THE INVENTION

One aspect of the present disclosure is directed to a catalyst composition comprising a platinum group metal (PGM) component and an inorganic oxide, wherein the Infrared (IR) intensity ratio of bridge CO to atop CO on the PGM component is less than 3:1 under standard CO adsorption procedure.

Another aspect of the present disclosure is directed to a catalyst composition comprising a platinum group metal (PGM) component and an inorganic oxide, wherein the Infrared (IR) intensity ratio of gem-dicarbonyl CO to atop CO on the PGM component is less than 5:1 under standard CO adsorption procedure.

Another aspect of the present disclosure is directed to a catalyst article for treating exhaust gas comprising: a substrate; and a first catalytic region on the substrate; wherein the first catalytic region comprises a first PGM component and a first inorganic oxide, wherein the IR intensity ratio of bridge CO to atop CO on the PGM component is less than 3:1 under standard CO adsorption procedure.

Another aspect of the present disclosure is directed to a catalyst article for treating exhaust gas comprising: a substrate; and a first catalytic region on the substrate; wherein the first catalytic region comprises a first PGM component and a first inorganic oxide, wherein the IR intensity ratio of gem-dicarbonyl CO to atop CO on the PGM component is less than 5:1 under standard CO adsorption procedure.

Another aspect of the present disclosure is directed to a catalyst article for treating exhaust gas comprising: a substrate; a first catalytic region on the substrate, wherein the first catalytic region comprises a first PGM component, and a first inorganic oxide; and a second catalytic region on the substrate, wherein the second catalytic region comprises a second PGM component, and a second inorganic oxide; wherein at least one of the first inorganic oxide and the second inorganic oxide is doped with 10-30% dopant.

The invention also encompasses an exhaust system for internal combustion engines that comprises the three-way catalyst component of the invention.

The invention also encompasses treating an exhaust gas from an internal combustion engine, in particular for treating exhaust gas from a gasoline engine. The method comprises contacting the exhaust gas with the three-way catalyst component or article of the invention.

BRIEF DESCRIPTION OF THE DRAWINGS

FIG. 1a shows the IR intensity ratios of bridge Co to atop CO on Pd/La-alumina catalysts with different La loadings; and FIG. 1b shows the IR Spectra of bridge CO to atop CO on Pd/La—$Al_2O_3$ catalysts.

FIG. 2 shows catalyst performances on Pd/La-alumina coated catalysts with different La loadings.

FIG. 3a shows the IR intensity ratio of gem-dicarbonyl to atop CO on Rh/La—$Al_2O_3$ catalysts with different La loadings; and FIG. 3b shows the IR spectra of gem-dicarbonyl to atop CO on Rh/La—$Al_2O_3$ catalysts.

DETAILED DESCRIPTION OF THE INVENTION

The present invention is directed to the catalytic treatment of combustion exhaust gas, such as that produced by gasoline engines or other engines, and to related catalytic articles and systems. More specifically, the invention relates the simultaneous treatment of $NO_N$, CO, and HC in a vehicular exhaust system.

Most of technology development in TWC have been focused on improved thermal stability to keep higher PGM dispersion to improve the performance through the development of doped support materials with higher thermal durability. The dopant for the support have been focused on its use as stabilizer for TWC, and the content of dopant below 5 wt % is enough to stabilize the materials. Indeed, La doping to alumina improves the surface area after thermal aging at 1000° C. from 60 $m^2$/g at La=0 wt % to 90 $m^2$/g at La=5 wt %, and further doping of La does not make further improvement of the surface are, e.g. 67 $m^2$/g at La=20 wt %. Surprisingly, the inventors have discovered an effective suppression of CO poisoning onto PGM which is only appeared with high-doped support materials. The inventors have discovered a new role of doped element in the support material for the effective utilization of PGM active site even under high concentration CO gas. The processes of the present invention can potentially reduce the PGM amount and lower costs of the catalyst.

One aspect of the present disclosure is directed to a catalyst composition comprising a platinum group metal (PGM) component and an inorganic oxide, wherein the Infrared (IR) intensity ratio of bridge CO to atop CO on the PGM component is less than 3:1 under standard CO adsorption procedure.

The PGM component can be Pd, Rh, or Pt. In some embodiments, the PGM component is Pd or Rh. In further embodiments, the PGM component is Pd.

The catalyst composition can comprise up to 20 wt. % of the PGM component. Preferably, the catalyst composition can comprise 0.05-10 wt. %, more preferably, 0.2-5 wt. % of the PGM component.

The catalyst composition can further comprise another PGM component.

Standard CO adsorption procedure can be as follows. For the preconditioning, the PGM catalyst powders are oxidized (10% $O_2$, 100 cc/min, He buffer) to remove organic contaminants and then reduced under 3% $H_2$ (100 cc/min, He buffer) to form metallic PGM of the catalyst. Then CO gas (1% CO, 100 cc/m, He buffer) is introduced for the adsorption, and the IR spectra are collected at room temperature (e.g., about 20-25° C.). The quantity of the powder samples typically can be 30 mg for the IR measurement.

Typically, two major adsorption states of CO on PGM is appeared in the IR spectra. The IR absorption peak around 2090 $cm^{-1}$ for Pd, 2070 $cm^{-1}$ for Rh, or 2090 $cm^{-1}$ for Pt is assignable to atop site where CO is binding to one PGM atom at the surface of the particle. The IR absorption peak around 1990 $cm^{-1}$ for Pd, 1870 $cm^{-1}$ for Rh, or 1850 $cm^{-1}$ for Pt is assignable to bridge site where CO is binding to two PGM atoms at the surface of the particle. The bridge site provides strongly adsorbed CO on the PGM surface, and the bridge-site CO thus stabilized can block the adsorption site of PGM, i.e. poisoning of the active site by CO. The atop site makes more weakly adsorbed CO on the PGM surface, the desorption and reaction of the atop CO can be promoted as respect to the bridge CO. The reduced ratio of bridge-site to atop-site CO can indicate that influence of CO poisoning to PGM is tends to be suppressed.

The IR intensity ratio of bridge CO to atop CO on the PGM component can be less than 5:2 or 2:1.

The inorganic oxide can be an oxide of Groups 2, 3, 4, 5, 13 and 14 elements. The inorganic oxide is preferably a refractory metal oxide that exhibits chemical and physical stability at high temperatures, such as the temperatures associated with gasoline engine exhaust. The inorganic oxide can be selected from the group consisting of alumina, silica, titania, and mixed oxides or composite oxides thereof. More preferably, the inorganic oxide is alumina. The inorganic oxide can be a support material for the PGM component.

The inorganic oxides preferably have a fresh surface area of greater than 80 $m^2/g$, pore volumes in the range 0.1 to 4 mL/g. High surface area inorganic oxides having a surface area greater than 100 $m^2/g$ are particularly preferred, e.g. high surface area alumina.

The inorganic oxide can be doped with a dopant. The dopant can be selected from the group consisting of La, Sr, Si, Ba, Y, Pr, Nd, and Ce. Preferably, the dopant can be La, Ba, or Ce. Most preferably, the dopant is La. The dopant content in the inorganic oxide (e.g., alumina) can be 10-30 wt. %, 10-25 wt. %, or 10-20 wt. %. The dopant content in the inorganic oxide (e.g., alumina) can also be 15-30 wt. %, 15-25 wt. %, or 15-20 wt. %.

The catalyst composition can further comprise an oxygen storage capacity (OSC) material, and/or an alkali or alkali earth metal component.

The OSC material is preferably selected from the group consisting of cerium oxide, zirconium oxide, a ceria-zirconia mixed oxide, and an alumina-ceria-zirconia mixed oxide. More preferably, the OSC material comprises the ceria-zirconia mixed oxide. The ceria-zirconia mixed oxide can further comprise some dopants, such as, La, Nd, Y, Pr, etc.

The ceria-zirconia mixed oxide can have a molar ratio of zirconia to ceria at least 50:50, preferably, higher than 60:40, more preferably, higher than 75:25. In addition, the OSC material may function as a support material for the PGM component. In some embodiments, the PGM component is supported on the OSC material and the inorganic oxide The OSC material (e.g., ceria-zirconia mixed oxide) can be from 10 to 90 wt %, preferably, 25-75 wt %, more preferably, 35-65 wt %, based on the total weight of the catalyst composition.

The OSC material and the inorganic oxide can have a weight ratio of no greater than 10:1, preferably, no greater than 8:1 or 5:1, more preferably, no greater than 4:1 or 3:1, most preferably, no greater than 2:1.

Alternatively, the OSC material and the inorganic oxide can have a weight ratio of 10:1 to 1:10, preferably, 8:1 to 1:8 or 5:1 to 1:5; more preferably, 4:1 to 1:4 or 3:1 to 1:3; and most preferably, 2:1 to 1:2.

In some embodiments, the alkali or alkali earth metal may be deposited on the OSC material. Alternatively, or in addition, the alkali or alkali earth metal may be deposited on the inorganic oxide. That is, in some embodiments, the alkali or alkali earth metal may be deposited on, i.e. present on, both the OSC material and the inorganic oxide.

Preferably the alkali or alkali earth metal is supported/ deposited on the inorganic oxide (e.g., alumina). In addition to, or alternatively to, being in contact with the inorganic oxide, the alkali or alkali earth metal may be in contact with the OSC material and also the PGM component.

The alkali or alkali earth metal is preferably barium or strontium. Preferably the barium or strontium, where present, is present in an amount of 0.1 to 15 weight percent, and more preferably 3 to 10 weight percent, based on the total weight of the catalyst composition.

Preferably the barium is present as a $BaCO_3$ composite material. Such a material can be preformed by any method known in the art, for example incipient wetness impregnation or spray-drying.

Another aspect of the present disclosure is directed to a catalyst composition comprising a platinum group metal (PGM) component and an inorganic oxide, wherein the IR intensity ratio of gem-dicarbonyl CO to atop CO on the PGM component is less than 5:1 under standard CO adsorption procedure.

The PGM component can be Pd, Rh, or Pt. In some embodiments, the PGM component is Pd or Rh. In further embodiments, the PGM component is Rh.

The catalyst composition can comprise up to 20 wt. % of the PGM component. Preferably, the catalyst composition can comprise 0.05-10 wt. %, more preferably, 0.2-5 wt. % of the PGM component.

The catalyst composition can further comprise another PGM component.

Typically, two major adsorption states of CO on PGM is appeared in the IR spectra. The IR absorption peak around 2090 $cm^{-1}$ for Pd, 2070 $cm^{-1}$ for Rh, or 2090 $cm^{-1}$ for Pt is assignable to atop site where CO is binding to one PGM atom at the surface of the particle. The IR absorption peak around 1990 $cm^{-1}$ for Pd, 1870 $cm^{-1}$ for Rh, or 1850 $cm^{-1}$ for Pt is assignable to bridge site where CO is binding to two PGM atoms at the surface of the particle. The bridge site provides strongly adsorbed CO on the PGM surface, and the bridge-site CO thus stabilized can block the adsorption site of PGM, i.e. poisoning of the active site by CO. The atop site makes more weakly adsorbed CO on the PGM surface, the desorption and reaction of the atop CO can be promoted as respect to the bridge CO. The reduced ratio of bridge-site to atop-site CO can indicate that influence of CO poisoning to PGM tends to be suppressed.

In the case of Rh, additional adsorption state of gem-dicarbonyl where two CO molecules are binding to one Rh atom at the surface of the particle. The IR absorption peaks around 2090 and 2030 $cm^{-1}$ are assignable to the gem-dicarbonyl site for Rh. The gem-dicarbonyl is stable formation of CO—Rh local complex i.e. poisoning of the active site by CO, therefore the catalytic reactivity is lower for the gem-carbonyl CO than the atop CO on Rh. The reduced ratio of gem-dicarbonyl to atop-site CO can indicate that influence of CO poisoning to Rh tends to be suppressed.

The IR intensity ratio of gem-dicarbonyl CO to atop CO on the PGM component can be less than 4:1, 3:1, or 5:2.

The inorganic oxide can be an oxide of Groups 2, 3, 4, 5, 13 and 14 elements. The inorganic oxide is preferably a refractory metal oxide that exhibits chemical and physical stability at high temperatures, such as the temperatures associated with gasoline engine exhaust. The inorganic oxide can be selected from the group consisting of alumina, silica, titania, and mixed oxides or composite oxides thereof. More preferably, the inorganic oxide is alumina. The inorganic oxide can be a support material for the PGM component.

The inorganic oxides preferably have a fresh surface area of greater than 80 $m^2/g$, pore volumes in the range 0.1 to 4 mL/g. High surface area inorganic oxides having a surface area greater than 100 $m^2/g$ are particularly preferred, e.g. high surface area alumina.

The inorganic oxide can be doped with a dopant. The dopant can be selected from the group consisting of La, Sr, Si, Ba, Y, Pr, Nd, and Ce. Preferably, the dopant can be La, Ba, or Ce. Most preferably, the dopant is La. The dopant content in the inorganic oxide (e.g., alumina) can be 10-30 wt. %, 10-25 wt. %, or 10-20 wt. %. The dopant content in the inorganic oxide (e.g., alumina) can also be 15-30 wt. %, 15-25 wt. %, or 15-20 wt. %.

The catalyst composition can further comprise an oxygen storage capacity (OSC) material, and/or an alkali or alkali earth metal component.

The OSC material is preferably selected from the group consisting of cerium oxide, zirconium oxide, a ceria-zirconia mixed oxide, and an alumina-ceria-zirconia mixed oxide. More preferably, the OSC material comprises the ceria-zirconia mixed oxide. The ceria-zirconia mixed oxide can further comprise some dopants, such as, La, Nd, Y, Pr, etc.

The ceria-zirconia mixed oxide can have a molar ratio of zirconia to ceria at least 50:50, preferably, higher than 60:40, more preferably, higher than 75:25. In addition, the OSC material may function as a support material for the PGM component. In some embodiments, the PGM component is supported on the OSC material and the inorganic oxide The OSC material (e.g., ceria-zirconia mixed oxide) can be from 10 to 90 wt %, preferably, 25-75 wt %, more preferably, 35-65 wt %, based on the total weight of the catalyst composition.

The OSC material and the inorganic oxide can have a weight ratio of no greater than 10:1, preferably, no greater than 8:1 or 5:1, more preferably, no greater than 4:1 or 3:1, most preferably, no greater than 2:1.

Alternatively, the OSC material and the inorganic oxide can have a weight ratio of 10:1 to 1:10, preferably, 8:1 to 1:8 or 5:1 to 1:5; more preferably, 4:1 to 1:4 or 3:1 to 1:3; and most preferably, 2:1 to 1:2.

In some embodiments, the alkali or alkali earth metal may be deposited on the OSC material. Alternatively, or in addition, the alkali or alkali earth metal may be deposited on the inorganic oxide. That is, in some embodiments, the alkali or alkali earth metal may be deposited on, i.e. present on, both the OSC material and the inorganic oxide.

Preferably the alkali or alkali earth metal is supported/deposited on the inorganic oxide (e.g., alumina). In addition to, or alternatively to, being in contact with the inorganic oxide, the alkali or alkali earth metal may be in contact with the OSC material and also the PGM component.

The alkali or alkali earth metal is preferably barium or strontium. Preferably the barium or strontium, where present, is present in an amount of 0.1 to 15 weight percent, and more preferably 3 to 10 weight percent, based on the total weight of the catalyst composition.

Preferably the barium is present as a $BaCO_3$ composite material. Such a material can be preformed by any method known in the art, for example incipient wetness impregnation or spray-drying.

Another aspect of the present disclosure is directed to a catalyst article for treating exhaust gas comprising: a substrate; and a first catalytic region on the substrate; wherein the first catalytic region comprises a first PGM component and a first inorganic oxide, wherein the IR intensity ratio of bridge CO to atop CO on the PGM component is less than 3:1 under standard CO adsorption procedure.

The first PGM component can be Pd, Rh, or Pt. In some embodiments, the first PGM component is Pd or Rh. In further embodiments, the first PGM component is Pd. In yet another further embodiment, the first catalytic region is substantially free of PGMs other than palladium.

The first catalytic region can comprise up to 350 $g/ft^3$ of the first PGM component. Preferably, the first catalytic region can comprise 10-300 $g/ft^3$, more preferably, 25-150 $g/ft^3$ of the first PGM component.

The IR intensity ratio of bridge CO to atop CO on the first PGM component can be less than 5:2 or 2:1.

The first inorganic oxide can be an oxide of Groups 2, 3, 4, 5, 13 and 14 elements. The first inorganic oxide is preferably a refractory metal oxide that exhibits chemical and physical stability at high temperatures, such as the temperatures associated with gasoline engine exhaust. The first inorganic oxide can be selected from the group consisting of alumina, silica, titania, and mixed oxides or composite oxides thereof. More preferably, the first inorganic oxide is alumina. The first inorganic oxide can be a support material for the first PGM component.

The first inorganic oxides preferably have a fresh surface area of greater than 80 $m^2/g$, pore volumes in the range 0.1 to 4 mL/g. High surface area inorganic oxides having a surface area greater than 100 $m^2/g$ are particularly preferred, e.g. high surface area alumina.

The first inorganic oxide can be doped with a dopant. The dopant can be selected from the group consisting of La, Sr, Si, Ba, Y, Pr, Nd, and Ce. Preferably, the dopant can be La, Ba, or Ce. Most preferably, the dopant is La. The dopant content in the first inorganic oxide (e.g., alumina) can be 10-30 wt. %, 10-25 wt. %, or 10-20 wt. %. The dopant content in the first inorganic oxide (e.g., alumina) can also be 15-30 wt. %, 15-25 wt. %, or 15-20 wt. %.

The first catalytic region can further comprise a first oxygen storage capacity (OSC) material, and/or a first alkali or alkali earth metal component.

The total washcoat loading of the first catalytic region can be from 0.1 to 5 g/in$^3$. Preferably, the total washcoat loading of the first catalytic region is 0.5 to 3.5 g/in$^3$, most preferably, the total washcoat loading of the first catalytic region is 1 to 2.5 g/in$^3$.

The first OSC material is preferably selected from the group consisting of cerium oxide, zirconium oxide, a ceria-zirconia mixed oxide, and an alumina-ceria-zirconia mixed oxide. More preferably, the first OSC material comprises the ceria-zirconia mixed oxide. The ceria-zirconia mixed oxide can further comprise some dopants, such as, La, Nd, Y, Pr, etc.

The ceria-zirconia mixed oxide can have a molar ratio of zirconia to ceria at least 50:50, preferably, higher than 60:40, more preferably, higher than 75:25. In addition, the first OSC material may function as a support material for the first PGM component. In some embodiments, the first PGM component is supported on the first OSC material and the first inorganic oxide The first OSC material (e.g., ceria-zirconia mixed oxide) can be from 10 to 90 wt %, preferably, 25-75 wt %, more preferably, 35-65 wt %, based on the total washcoat loading of the first catalytic region.

The first OSC material loading in the first catalytic region can be less than 1.5 g/in$^3$. In some embodiments, the first OSC material loading in the first catalytic region is no greater than 1.2 g/in$^3$, 1.0 g/in$^3$, 0.9 g/in$^3$, 0.8 g/in$^3$, 0.7 g/in$^3$, or 0.6 g/in$^3$.

The first OSC material and the inorganic oxide can have a weight ratio of no greater than 10:1, preferably, no greater than 8:1 or 5:1, more preferably, no greater than 4:1 or 3:1, most preferably, no greater than 2:1.

Alternatively, the first OSC material and the first inorganic oxide can have a weight ratio of 10:1 to 1:10, preferably, 8:1 to 1:8 or 5:1 to 1:5; more preferably, 4:1 to 1:4 or 3:1 to 1:3; and most preferably, 2:1 to 1:2.

In some embodiments, the first alkali or alkali earth metal may be deposited on the first OSC material. Alternatively, or in addition, the first alkali or alkali earth metal may be deposited on the inorganic oxide. That is, in some embodiments, the first alkali or alkali earth metal may be deposited on, i.e. present on, both the first OSC material and the first inorganic oxide.

Preferably the first alkali or alkali earth metal is supported/deposited on the first inorganic oxide (e.g., alumina). In addition to, or alternatively to, being in contact with the first inorganic oxide, the first alkali or alkali earth metal may be in contact with the first OSC material and also the first PGM component.

The first alkali or alkali earth metal is preferably barium or strontium. Preferably the barium or strontium, where present, is present in an amount of 0.1 to 15 weight percent, and more preferably 3 to 10 weight percent, based on the total washcoat loading of the first catalytic region.

Preferably the barium is present as a BaCO$_3$ composite material. Such a material can be performed by any method known in the art, for example incipient wetness impregnation or spray-drying.

The catalyst article can further comprise a second catalytic region. The second catalytic region can comprise a second PGM component, a second oxygen storage capacity (OSC) material, a second alkali or alkali earth metal component, and/or a second inorganic oxide.

The second PGM component can be selected from the group consisting of palladium, platinum, rhodium, and a mixture thereof. In some embodiments, the second PGM component can be Pd, when the first PGM component is Rh. In other embodiments, the second PGM component can be Rh, when the first PGM component is Pd.

The second catalytic region can comprise up to 350 g/ft$^3$ of the second PGM component. Preferably, the second catalytic region can comprise 10-300 g/ft$^3$, more preferably, 25-150 g/ft$^3$ of the second PGM component.

The total washcoat loading of the second catalytic region can be from 0.1 to 5 g/in$^3$. Preferably, the total washcoat loading of the second catalytic region is 0.5 to 3.5 g/in$^3$, most preferably, the total washcoat loading of the second catalytic region is 1 to 2.5 g/in$^3$.

The second inorganic oxide is preferably an oxide of Groups 2, 3, 4, 5, 13 and 14 elements. The second inorganic oxide is preferably selected from the group consisting of alumina, magnesia, lanthana, silica, neodymium, praseodymium, yttrium oxides, titania, niobia, tantalum oxides, molybdenum oxides, tungsten oxides, and mixed oxides or composite oxides thereof. More preferably, the second inorganic oxide is selected from the group consisting of alumina, magnesia, silica, lanthanum, neodymium, praseodymium, yttrium oxides, and mixed oxides or composite oxides thereof. Particularly preferably, the second inorganic oxide is alumina, a lanthanum/alumina composite oxide, or a magnesia/alumina composite oxide. One especially preferred second inorganic oxide is a lanthanum/alumina composite oxide. The second inorganic oxide may be a support material for the second PGM component, and/or for the second alkali or alkali earth metal.

The second inorganic oxides preferably have a fresh surface area of greater than 80 m$^2$/g, pore volumes in the range 0.1 to 4 mL/g. High surface area inorganic oxides having a surface area greater than 100 m$^2$/g are particularly preferred, e.g. high surface area alumina. Other preferred second inorganic oxides include lanthanum/alumina composite oxides, optionally further comprising a cerium-containing component, e.g. ceria. In such cases the ceria may be present on the surface of the lanthanum/alumina composite oxide, e.g., as a coating.

Alternatively, the second inorganic oxide can also have the same features as the first inorganic oxide (e.g., with dopant from 10-30%, and/or the IR intensity ratio of bridge CO to atop CO on the second PGM component can be less than 3:1).

The second OSC material is preferably selected from the group consisting of cerium oxide, zirconium oxide, a ceria-zirconia mixed oxide, and an alumina-ceria-zirconia mixed oxide. More preferably, the second OSC material comprises the ceria-zirconia mixed oxide. The ceria-zirconia mixed oxide can further comprise some dopants, such as, La, Nd, Y, Pr, etc.

The ceria-zirconia mixed oxide can have a molar ratio of zirconia to ceria at least 50:50, preferably, higher than 60:40, more preferably, higher than 75:25. In addition, the second OSC material may function as a support material for the second PGM component. In some embodiments, the second PGM component are supported on the second OSC material and the second inorganic oxide The second OSC material (e.g., ceria-zirconia mixed oxide) can be from 10 to 90 wt %, preferably, 25-75 wt %, more preferably, 35-65 wt %, based on the total washcoat loading of the second catalytic region.

The second OSC material loading in the second catalytic region can be less than 1.5 $g/in^3$. In some embodiments, the second OSC material loading in the second catalytic region is no greater than 1.2 $g/in^3$, 1.0 $g/in^3$, 0.9 $g/in^3$, 0.8 $g/in^3$, 0.7 $g/in^3$, or 0.6 $g/in^3$.

The second OSC material and the second inorganic oxide can have a weight ratio of no greater than 10:1, preferably, no greater than 8:1 or 5:1, more preferably, no greater than 4:1 or 3:1, most preferably, no greater than 2:1.

Alternatively, the second OSC material and the second inorganic oxide can have a weight ratio of 10:1 to 1:10, preferably, 8:1 to 1:8 or 5:1 to 1:5; more preferably, 4:1 to 1:4 or 3:1 to 1:3; and most preferably, 2:1 to 1:2.

In some embodiments, the second alkali or alkali earth metal may be deposited on the second OSC material. Alternatively, or in addition, the second alkali or alkali earth metal may be deposited on the second inorganic oxide. That is, in some embodiments, the second alkali or alkali earth metal may be deposited on, i.e. present on, both the second OSC material and the second inorganic oxide.

Preferably the second alkali or alkali earth metal is supported/deposited on the second inorganic oxide (e.g., alumina). In addition to, or alternatively to, being in contact with the second inorganic oxide, the second alkali or alkali earth metal may be in contact with the second OSC material and also the second PGM component.

The second alkali or alkali earth metal is preferably barium or strontium. Preferably the barium or strontium, where present, is present in an amount of 0.1 to 15 weight percent, and more preferably 3 to 10 weight percent, based on the total washcoat loading of the second catalytic region.

Preferably the barium is present as a $BaCO_3$ composite material. Such a material can be performed by any method known in the art, for example incipient wetness impregnation or spray-drying.

In some embodiments, the first PGM component and the second PGM component has a weight ratio of from 60:1 to 1:60. Preferably, the first PGM component and the second PGM component has a weight ratio of from 30:1 to 1:30. More preferably, the first PGM component and the second PGM component has a weight ratio of from 20:1 to 1:20. Most preferably, the first PGM component and the second PGM component has a weight ratio of from 15:1 to 1:15.

Another aspect of the present disclosure is directed to a catalyst article for treating exhaust gas comprising: a substrate; and a first catalytic region on the substrate; wherein the first catalytic region comprises a first PGM component and a first inorganic oxide, wherein the IR intensity ratio of gem-dicarbonyl CO to atop CO on the PGM component is less than 5:1 under standard CO adsorption procedure.

The first PGM component can be Pd, Rh, or Pt. In some embodiments, the first PGM component is Pd or Rh. In further embodiments, the first PGM component is Rh. In yet another further embodiment, the first catalytic region is substantially free of PGMs other than Rh.

The first catalytic region can comprise up to 350 $g/ft^3$ of the first PGM component. Preferably, the first catalytic region can comprise 10-300 $g/ft^3$, more preferably, 25-150 $g/ft^3$ of the first PGM component.

The IR intensity ratio of gem-dicarbonyl CO to atop CO on the first PGM component can be less than 4:1, 3:1, or 5:2.

The first inorganic oxide can be an oxide of Groups 2, 3, 4, 5, 13 and 14 elements. The first inorganic oxide is preferably a refractory metal oxide that exhibits chemical and physical stability at high temperatures, such as the temperatures associated with gasoline engine exhaust. The first inorganic oxide can be selected from the group consisting of alumina, silica, titania, and mixed oxides or composite oxides thereof. More preferably, the first inorganic oxide is alumina. The first inorganic oxide can be a support material for the first PGM component.

The first inorganic oxides preferably have a fresh surface area of greater than 80 $m^2/g$, pore volumes in the range 0.1 to 4 mL/g. High surface area inorganic oxides having a surface area greater than 100 $m^2/g$ are particularly preferred, e.g. high surface area alumina.

The first inorganic oxide can be doped with a dopant. The dopant can be selected from the group consisting of La, Sr, Si, Ba, Y, Pr, Nd, and Ce. Preferably, the dopant can be La, Ba, or Ce. Most preferably, the dopant is La. The dopant content in the first inorganic oxide (e.g., alumina) can be 10-30 wt. %, 10-25 wt. %, or 10-20 wt. %. The dopant content in the first inorganic oxide (e.g., alumina) can also be 15-30 wt. %, 15-25 wt. %, or 15-20 wt. %.

The first catalytic region can further comprise a first oxygen storage capacity (OSC) material, and/or a first alkali or alkali earth metal component.

The total washcoat loading of the first catalytic region can be from 0.1 to 5 $g/in^3$. Preferably, the total washcoat loading of the first catalytic region is 0.5 to 3.5 $g/in^3$, most preferably, the total washcoat loading of the first catalytic region is 1 to 2.5 $g/in^3$.

The first OSC material is preferably selected from the group consisting of cerium oxide, zirconium oxide, a ceria-zirconia mixed oxide, and an alumina-ceria-zirconia mixed oxide. More preferably, the first OSC material comprises the ceria-zirconia mixed oxide. The ceria-zirconia mixed oxide can further comprise some dopants, such as, La, Nd, Y, Pr, etc.

The ceria-zirconia mixed oxide can have a molar ratio of zirconia to ceria at least 50:50, preferably, higher than 60:40, more preferably, higher than 75:25. In addition, the first OSC material may function as a support material for the first PGM component. In some embodiments, the first PGM component is supported on the first OSC material and the first inorganic oxide The first OSC material (e.g., ceria-zirconia mixed oxide) can be from 10 to 90 wt %, preferably, 25-75 wt %, more preferably, 35-65 wt %, based on the total washcoat loading of the first catalytic region.

The first OSC material loading in the first catalytic region can be less than 1.5 $g/in^3$. In some embodiments, the first OSC material loading in the first catalytic region is no greater than 1.2 $g/in^3$, 1.0 $g/in^3$, 0.9 $g/in^3$, 0.8 $g/in^3$, 0.7 $g/in^3$, or 0.6 $g/in^3$.

The first OSC material and the inorganic oxide can have a weight ratio of no greater than 10:1, preferably, no greater than 8:1 or 5:1, more preferably, no greater than 4:1 or 3:1, most preferably, no greater than 2:1.

Alternatively, the first OSC material and the first inorganic oxide can have a weight ratio of 10:1 to 1:10, preferably, 8:1 to 1:8 or 5:1 to 1:5; more preferably, 4:1 to 1:4 or 3:1 to 1:3; and most preferably, 2:1 to 1:2.

In some embodiments, the first alkali or alkali earth metal may be deposited on the first OSC material. Alternatively, or in addition, the first alkali or alkali earth metal may be deposited on the inorganic oxide. That is, in some embodiments, the first alkali or alkali earth metal may be deposited on, i.e. present on, both the first OSC material and the first inorganic oxide.

Preferably the first alkali or alkali earth metal is supported/deposited on the first inorganic oxide (e.g., alumina). In addition to, or alternatively to, being in contact with the first inorganic oxide, the first alkali or alkali earth metal may be in contact with the first OSC material and also the first PGM component.

The first alkali or alkali earth metal is preferably barium or strontium. Preferably the barium or strontium, where present, is present in an amount of 0.1 to 15 weight percent, and more preferably 3 to 10 weight percent, based on the total washcoat loading of the first catalytic region.

Preferably the barium is present as a $BaCO_3$ composite material. Such a material can be performed by any method known in the art, for example incipient wetness impregnation or spray-drying.

The catalyst article can further comprise a second catalytic region. The second catalytic region can comprise a second PGM component, a second oxygen storage capacity (OSC) material, a second alkali or alkali earth metal component, and/or a second inorganic oxide.

The second PGM component can be selected from the group consisting of palladium, platinum, rhodium, and a mixture thereof. In some embodiments, the second PGM component can be Pd, when the first PGM component is Rh. In other embodiments, the second PGM component can be Rh, when the first PGM component is Pd.

The second catalytic region can comprise up to 350 $g/ft^3$ of the second PGM component. Preferably, the second catalytic region can comprise 10-300 $g/ft^3$, more preferably, 25-150 $g/ft^3$ of the second PGM component.

The total washcoat loading of the second catalytic region can be from 0.1 to 5 $g/in^3$. Preferably, the total washcoat loading of the second catalytic region is 0.5 to 3.5 $g/in^3$, most preferably, the total washcoat loading of the second catalytic region is 1 to 2.5 $g/in^3$.

The second inorganic oxide is preferably an oxide of Groups 2, 3, 4, 5, 13 and 14 elements. The second inorganic oxide is preferably selected from the group consisting of alumina, magnesia, lanthana, silica, neodymium, praseodymium, yttrium oxides, titania, niobia, tantalum oxides, molybdenum oxides, tungsten oxides, and mixed oxides or composite oxides thereof. More preferably, the second inorganic oxide is selected from the group consisting of alumina, magnesia, silica, lanthanum, neodymium, praseodymium, yttrium oxides, and mixed oxides or composite oxides thereof. Particularly preferably, the second inorganic oxide is alumina, a lanthanum/alumina composite oxide, or a magnesia/alumina composite oxide. One especially preferred second inorganic oxide is a lanthanum/alumina composite oxide. The second inorganic oxide may be a support material for the second PGM component, and/or for the second alkali or alkali earth metal.

The second inorganic oxides preferably have a fresh surface area of greater than 80 $m^2/g$, pore volumes in the range 0.1 to 4 mL/g. High surface area inorganic oxides having a surface area greater than 100 $m^2/g$ are particularly preferred, e.g. high surface area alumina. Other preferred second inorganic oxides include lanthanum/alumina composite oxides, optionally further comprising a cerium-containing component, e.g. ceria. In such cases the ceria may be present on the surface of the lanthanum/alumina composite oxide, e.g., as a coating.

Alternatively, the second inorganic oxide can also have the same features as the first inorganic oxide (e.g., with dopant from 10-30%, and/or the IR intensity ratio of bridge CO to atop CO on the second PGM component can be less than 3:1).

The second OSC material is preferably selected from the group consisting of cerium oxide, zirconium oxide, a ceria-zirconia mixed oxide, and an alumina-ceria-zirconia mixed oxide. More preferably, the second OSC material comprises the ceria-zirconia mixed oxide. The ceria-zirconia mixed oxide can further comprise some dopants, such as, La, Nd, Y, Pr, etc.

The ceria-zirconia mixed oxide can have a molar ratio of zirconia to ceria at least 50:50, preferably, higher than 60:40, more preferably, higher than 75:25. In addition, the second OSC material may function as a support material for the second PGM component. In some embodiments, the second PGM component are supported on the second OSC material and the second inorganic oxide The second OSC material (e.g., ceria-zirconia mixed oxide) can be from 10 to 90 wt %, preferably, 25-75 wt %, more preferably, 35-65 wt %, based on the total washcoat loading of the second catalytic region.

The second OSC material loading in the second catalytic region can be less than 1.5 $g/in^3$. In some embodiments, the second OSC material loading in the second catalytic region is no greater than 1.2 $g/in^3$, 1.0 $g/in^3$, 0.9 $g/in^3$, 0.8 $g/in^3$, 0.7 $g/in^3$, or 0.6 $g/in^3$.

The second OSC material and the second inorganic oxide can have a weight ratio of no greater than 10:1, preferably, no greater than 8:1 or 5:1, more preferably, no greater than 4:1 or 3:1, most preferably, no greater than 2:1.

Alternatively, the second OSC material and the second inorganic oxide can have a weight ratio of 10:1 to 1:10, preferably, 8:1 to 1:8 or 5:1 to 1:5; more preferably, 4:1 to 1:4 or 3:1 to 1:3; and most preferably, 2:1 to 1:2.

In some embodiments, the second alkali or alkali earth metal may be deposited on the second OSC material. Alternatively, or in addition, the second alkali or alkali earth metal may be deposited on the second inorganic oxide. That is, in some embodiments, the second alkali or alkali earth metal may be deposited on, i.e. present on, both the second OSC material and the second inorganic oxide.

Preferably the second alkali or alkali earth metal is supported/deposited on the second inorganic oxide (e.g., alumina). In addition to, or alternatively to, being in contact with the second inorganic oxide, the second alkali or alkali earth metal may be in contact with the second OSC material and also the second PGM component.

The second alkali or alkali earth metal is preferably barium or strontium. Preferably the barium or strontium, where present, is present in an amount of 0.1 to 15 weight percent, and more preferably 3 to 10 weight percent, based on the total washcoat loading of the second catalytic region.

Preferably the barium is present as a $BaCO_3$ composite material. Such a material can be performed by any method known in the art, for example incipient wetness impregnation or spray-drying.

In some embodiments, the first PGM component and the second PGM component has a weight ratio of from 60:1 to 1:60. Preferably, the first PGM component and the second PGM component has a weight ratio of from 30:1 to 1:30. More preferably, the first PGM component and the second PGM component has a weight ratio of from 20:1 to 1:20. Most preferably, the first PGM component and the second PGM component has a weight ratio of from 15:1 to 1:15.

Another aspect of the present disclosure is directed to a catalyst article for treating exhaust gas comprising: a substrate; a first catalytic region on the substrate, wherein the first catalytic region comprises a first PGM component, and a first inorganic oxide; and a second catalytic region on the substrate, wherein the second catalytic region comprises a second PGM component, and a second inorganic oxide; wherein at least one of the first inorganic oxide and the second inorganic oxide is doped with 10-30% dopant.

The catalyst article can have the ratio of bridge CO to atop CO on the first PGM component (e.g., Pd) of less than 3:1 under standard CO adsorption procedure.

The catalyst article can have the ratio of gem-dicarbonyl CO to atop CO on the second PGM component (e.g., Rh) of less than 5:1 under standard CO adsorption procedure.

The dopant for the first inorganic oxide or the second inorganic oxide is each independently selected from the group consisting of La, Sr, Si, Ba, Y, Pr, Nd, and Ce. In further embodiments, the dopant for the first inorganic oxide or the second inorganic oxide is La.

All the features, ranges, limitations disclosed above, in the third and/or fourth aspect of the present disclosure, are applicable under this fifth aspect of the present disclosure.

The catalyst article of the invention may comprise further components that are known to the skilled person. For example, the compositions of the invention may further comprise at least one binder and/or at least one surfactant. Where a binder is present, dispersible alumina binders are preferred.

Preferably the substrate is a flow-through monolith, or wall flow gasoline particulate filter. More preferably, the substrate is a flow-through monolith.

The flow-through monolith substrate has a first face and a second face defining a longitudinal direction there between. The flow-through monolith substrate has a plurality of channels extending between the first face and the second face. The plurality of channels extend in the longitudinal direction and provide a plurality of inner surfaces (e.g. the surfaces of the walls defining each channel). Each of the plurality of channels has an opening at the first face and an opening at the second face. For the avoidance of doubt, the flow-through monolith substrate is not a wall flow filter.

The first face is typically at an inlet end of the substrate and the second face is at an outlet end of the substrate.

The channels may be of a constant width and each plurality of channels may have a uniform channel width.

Preferably within a plane orthogonal to the longitudinal direction, the monolith substrate has from 100 to 900 channels per square inch, preferably from 300 to 750. For example, on the first face, the density of open first channels and closed second channels is from 300 to 750 channels per square inch. The channels can have cross sections that are rectangular, square, circular, oval, triangular, hexagonal, or other polygonal shapes.

The monolith substrate acts as a support for holding catalytic material. Suitable materials for forming the monolith substrate include ceramic-like materials such as cordierite, silicon carbide, silicon nitride, zirconia, mullite, spodumene, alumina-silica magnesia or zirconium silicate, or of porous, refractory metal. Such materials and their use in the manufacture of porous monolith substrates is well known in the art.

It should be noted that the flow-through monolith substrate described herein is a single component (i.e. a single brick). Nonetheless, when forming an emission treatment system, the monolith used may be formed by adhering together a plurality of channels or by adhering together a plurality of smaller monoliths as described herein. Such techniques are well known in the art, as well as suitable casings and configurations of the emission treatment system.

In embodiments wherein the catalyst article of the present comprises a ceramic substrate, the ceramic substrate may be made of any suitable refractory material, e.g., alumina, silica, titania, ceria, zirconia, magnesia, zeolites, silicon nitride, silicon carbide, zirconium silicates, magnesium silicates, aluminosilicates and metallo aluminosilicates (such as cordierite and spodumene), or a mixture or mixed oxide of any two or more thereof. Cordierite, a magnesium aluminosilicate, and silicon carbide are particularly preferred.

In embodiments wherein the catalyst article of the present invention comprises a metallic substrate, the metallic substrate may be made of any suitable metal, and in particular heat-resistant metals and metal alloys such as titanium and stainless steel as well as ferritic alloys containing iron, nickel, chromium, and/or aluminum in addition to other trace metals.

In some embodiments, the first catalytic region is supported/deposited directly on the substrate. In further embodiments, the second catalytic region is supported/deposited on the first catalytic region.

In other embodiments, the second catalytic region is supported/deposited directly on the substrate. In further embodiments, the first catalytic region is supported/deposited on the second catalytic region.

Another aspect of the present disclosure is directed to a method for treating a vehicular exhaust gas containing $NO_x$, CO, and HC using the catalyst article described herein. Catalytic converters equipped with TWC made according to the invention showed improved catalytic performance compared to conventional TWC (e.g., see Examples 3 and 5, and Tables 2 and 3).

Another aspect of the present disclosure is directed to a system for treating vehicular exhaust gas comprising the catalyst article described herein in conjunction with a conduit for transferring the exhaust gas through the system.

Definitions

The term "washcoat" is well known in the art and refers to an adherent coating that is applied to a substrate usually during production of a catalyst.

The acronym "PGM" as used herein refers to "platinum group metal". The term "platinum group metal" generally refers to a metal selected from the group consisting of Ru, Rh, Pd, Os, Ir and Pt, preferably a metal selected from the group consisting of Ru, Rh, Pd, Ir and Pt. In general, the term "PGM" preferably refers to a metal selected from the group consisting of Rh, Pt and Pd.

The term "mixed oxide" as used herein generally refers to a mixture of oxides in a single phase, as is conventionally known in the art. The term "composite oxide" as used herein generally refers to a composition of oxides having more than one phase, as is conventionally known in the art.

The expression "consist essentially" as used herein limits the scope of a feature to include the specified materials, and any other materials or steps that do not materially affect the basic characteristics of that feature, such as for example minor impurities. The expression "consist essentially of" embraces the expression "consisting of".

The expression "substantially free of" as used herein with reference to a material, typically in the context of the content of a region, a layer or a zone, means that the material in a minor amount, such as ≤5% by weight, preferably ≤2% by weight, more preferably ≤1% by weight. The expression "substantially free of" embraces the expression "does not comprise."

The expression "essentially free of" as used herein with reference to a material, typically in the context of the content of a region, a layer or a zone, means that the material in a trace amount, such as ≤1% by weight, preferably ≤0.5% by weight, more preferably ≤0.1% by weight. The expression "essentially free of" embraces the expression "does not comprise."

Any reference to an amount of dopant, particularly a total amount, expressed as a % by weight as used herein refers to the weight of the support material or the refractory metal oxide thereof.

The term "loading" as used herein refers to a measurement in units of $g/ft^3$ on a metal weight basis.

The following examples merely illustrate the invention. Those skilled in the art will recognize many variations that are within the spirit of the invention and scope of the claims.

EXAMPLES

Materials

All materials are commercially available and were obtained from known suppliers, unless noted otherwise.

General Procedure for the Doped Inorganic Oxide Synthesis

A commercially available γ-$Al_2O_3$ with surface area of about 150 $m^2/g$ was used as an $Al_2O_3$ support, and La addition to the $Al_2O_3$ support was performed as follows. An aqueous solution containing $La(NO_3)_3$ (La concentration=2.0 mmol/mL) was impregnated onto the $Al_2O_3$ support with target loading of La. This was followed by drying at 120° C. for 2 h and calcination in air at 600° C. for 2 h to yield the La-doped $Al_2O_3$ materials.

Example 1

Catalyst powder with 3 wt % Pd supported La-doped alumina with the content of La=1, 4, 10, and 15 wt % were exposed by CO under standard CO adsorption procedure. The ratio of bridge CO to atop CO site was detected by IR spectroscopy.

As shown in FIG. 1a and FIG. 1b, the IR intensity ratio of bridge CO to atop CO was reduced with increase in La content in alumina support. The reduced ratio of bridge CO to atop Co can indicate that CO poisoning to PGM tends to be suppressed.

Example 2

Catalyst performance testing was performed on the coated catalyst on cordierite substrate, consisting of 1 wt % Pd supported La-doped alumina with the content of La=5 or 10 wt %, under the following conditions using a simulated exhaust gas having the composition shown in Table 1.

In the catalyst performance testing, the temperature at which 50% of each of the HC, CO, and $NO_x$ components was converted was evaluated. The lower the temperature at which 50% was converted means the better performance as an exhaust gas purification catalyst.

In the catalyst performance testing, the gas flow rate was set at a spatial velocity of 100,000/hr, the temperature was raised from 100° C. to 400° C. at a heating rate of 25° C./min, the gas composition after passing through the catalyst was analyzed and the conversion rate was measured.

TABLE 1

Simulated Gas Composition for the Performance Test

| $C_3H_6$ (ppm) | CO (%) | $H_2$ (%) | $NO_X$ (ppm) | $O_2$ (%) | $CO_2$ (%) | $H_2O$ (%) | $N_2$ |
|---|---|---|---|---|---|---|---|
| 430 | 0.6 | 0.2 | 1000 | 0.6 | 15 | 10 | Balance |

As shown in FIG. 2, the temperatures at conversion of 50% for HC, CO, and NO were lower for higher-content La-doped alumina with La=10 wt % than 5 wt %.

Example 3

Catalyst 1 (Comparative)

Catalyst 1 is a three-way (Pd—Rh) catalyst with a double-layered structure. The bottom layer consists of Pd supported on a washcoat of a first CeZr mixed oxide, La-stabilized alumina with 4 wt %, Ba promotor. The washcoat loading of the bottom layer was about 2.5 $g/in^3$ with a Pd loading of 90 $g/ft^3$. The top layer consists of Rh supported on a washcoat of a second CeZr mixed oxide, La-stabilized alumina. The washcoat lading of the top layer was about 1.0 $g/in^3$ with a Rh loading of 9 $g/ft^3$. The total washcoat loading of Catalyst 1 was about 3.5 $g/in^3$.

Catalyst 2

Catalyst 2 is a three-way (Pd—Rh) catalyst with a double-layered structure. The bottom layer consists of Pd supported on a washcoat of a first CeZr mixed oxide, high-content La-doped alumina with 15 wt %, Ba promotor. The washcoat loading of the bottom layer was about 2.5 $g/in^3$ with a Pd loading of 90 $g/ft^3$. The top layer consists of Rh supported on a washcoat of a second CeZr mixed oxide, La-stabilized alumina. The washcoat lading of the top layer was about 1.0 $g/in^3$ with a Rh loading of 9 $g/ft^3$. The total washcoat loading of Catalyst 2 was about 3.5 $g/in^3$.

Comparative Catalyst 1 and Catalyst 2 were bench aged for 75 hours with fuel cut aging cycles, with peak temperature at 950° C. vehicle emissions were conducted over a commercial vehicle with 1.5 litre engine. Emissions were measured pre- and post-catalyst.

TABLE 2

Catalysts Performance by Bag Emission Analysis

| | Weighted Tailpipe Emissions (g/km) | | | |
|---|---|---|---|---|
| | HC | NMHC | CO/10 | $NO_x$ |
| Comparative Catalyst 1 | 0.033 | 0.023 | 0.089 | 0.021 |
| Catalyst 2 | 0.027 | 0.018 | 0.063 | 0.019 |

As shown in Table 2, Catalyst 2 showed significant reduction of emission of HC, NMHC, CO, and $NO_x$ in comparison with Comparative Catalyst 1.

Example 4

Catalyst powder with 3 wt % Rh supported La-doped alumina with the content of La=1, 4, 10, and 15 wt % were exposed by CO under standard CO adsorption procedure. The ratio of gem-dicarbonyl CO to atop CO site was detected by IR spectroscopy.

As shown in FIG. 3a and FIG. 3b, the IR intensity ratio of gem-dicarbonyl CO to atop CO was reduced with increase in La content in alumina support. The reduced ratio of gem-dicarbonyl CO to atop CO can indicate that CO poisoning to PGM tends to be suppressed.

Example 5

Catalyst 3 (Comparative)

Catalyst 3 is a three-way (Pd—Rh) catalyst with a double-layered structure. The bottom layer consists of Pd supported on a washcoat of a first CeZr mixed oxide, La-stabilized alumina with 4 wt %, Ba promotor. The washcoat loading of the bottom layer was about 2.0 g/in$^3$ with a Pd loading of 140 g/ft$^3$. The top layer consists of Rh supported on a washcoat of a second CeZr mixed oxide, La-stabilized alumina. The washcoat lading of the top layer was about 1.0 g/in$^3$ with a Rh loading of 25 g/ft$^3$. The total washcoat loading of Catalyst 3 was about 3.0 g/in$^3$.

Catalyst 4

Catalyst 4 is a three-way (Pd—Rh) catalyst with a double-layered structure. The bottom layer consists of Pd supported on a washcoat of a first CeZr mixed oxide, La-stabilized alumina with 4 wt %, Ba promotor. The washcoat loading of the bottom layer was about 2.0 g/in$^3$ with a Pd loading of 140 g/ft$^3$. The top layer consists of Rh supported on a washcoat of a second CeZr mixed oxide, high-content La-doped alumina with 15 wt %. The washcoat lading of the top layer was about 1.0 g/in$^3$ with a Rh loading of 25 g/ft$^3$. The total washcoat loading of Catalyst 4 was about 3.0 g/in$^3$.

Catalyst 5

Catalyst 5 is a three-way (Pd—Rh) catalyst with a double-layered structure. The bottom layer consists of Pd supported on a washcoat of a first CeZr mixed oxide, high-content La-doped alumina with 15 wt %, Ba promotor. The washcoat loading of the bottom layer was about 2.0 g/in$^3$ with a Pd loading of 140 g/ft$^3$. The top layer consists of Rh supported on a washcoat of a second CeZr mixed oxide, high-content La-doped alumina with 15 wt %. The washcoat lading of the top layer was about 1.0 g/in$^3$ with a Rh loading of 25 g/ft$^3$. The total washcoat loading of Catalyst 5 was about 3.0 g/in$^3$.

Comparative Catalyst 3, Catalyst 4, and Catalyst 5 were bench aged for 75 hours with fuel cut aging cycles, with peak temperature at 950° C. vehicle emissions were conducted over a commercial vehicle with 1.5 litre engine. Emissions were measured pre- and post-catalyst.

TABLE 3

Catalysts Performance by Bag Emission Analysis

| | Weighted Tailpipe Emissions (g/km) | | | |
|---|---|---|---|---|
| | HC | NMHC | CO/10 | NO$_x$ |
| Comparative Catalyst 3 | 0.018 | 0.009 | 0.071 | 0.015 |
| Catalyst 4 | 0.014 | 0.007 | 0.048 | 0.013 |
| Catalyst 5 | 0.013 | 0.007 | 0.027 | 0.010 |

As shown in Table 3, Catalyst 4 and Catalyst 5 showed significant reduction of emission of HC, NMHC, CO, and NO$_x$ in comparison with Comparative Catalyst 3.

We claim:

1. A catalyst article for treating exhaust gas comprising:
a substrate;
a first catalytic region on the substrate, wherein the first catalytic region comprises a first PGM component, and a first inorganic oxide; and
a second catalytic region on the substrate, wherein the second catalytic region comprises a second PGM component, and a second inorganic oxide;
wherein at least one of the first inorganic oxide and the second inorganic oxide is doped with 10-30% dopant; and
wherein the first inorganic oxide is alumina.

2. The catalyst article of claim 1, wherein the dopant for the first inorganic oxide and/or the second inorganic oxide is each independently selected from the group consisting of La, Sr, Si, Ba, Y, Pr, Nd, and Ce.

3. The catalyst article of claim 1, wherein the dopant for the first inorganic oxide is La.

4. The catalyst article of claim 1, wherein the first PGM component is Pd.

5. The catalyst article of claim 1, wherein the IR intensity ratio of bridge CO to atop CO on the first PGM component is less than 3:1 under standard CO adsorption procedure.

6. The catalyst article of claim 1, wherein the second inorganic oxide is alumina.

7. The catalyst article of claim 1, wherein the dopant for the second inorganic oxide is La.

8. The catalyst article of claim 1, wherein the second PGM component is Rh.

9. The catalyst article of claim 1, wherein the IR intensity ratio of gem-dicarbonyl CO to atop CO on the second PGM component is less than 5:1 under standard CO adsorption procedure.

10. An emission treatment system for treating a flow of a combustion exhaust gas comprising the catalyst article of claim 1.

11. A method of treating an exhaust gas from an internal combustion engine comprising contacting the exhaust gas with the catalyst article of claim 1.

* * * * *